July 10, 1923.
W. P. BULLARD
NUT GRADER
Filed May 2, 1923
1,461,265
2 Sheets-Sheet 2
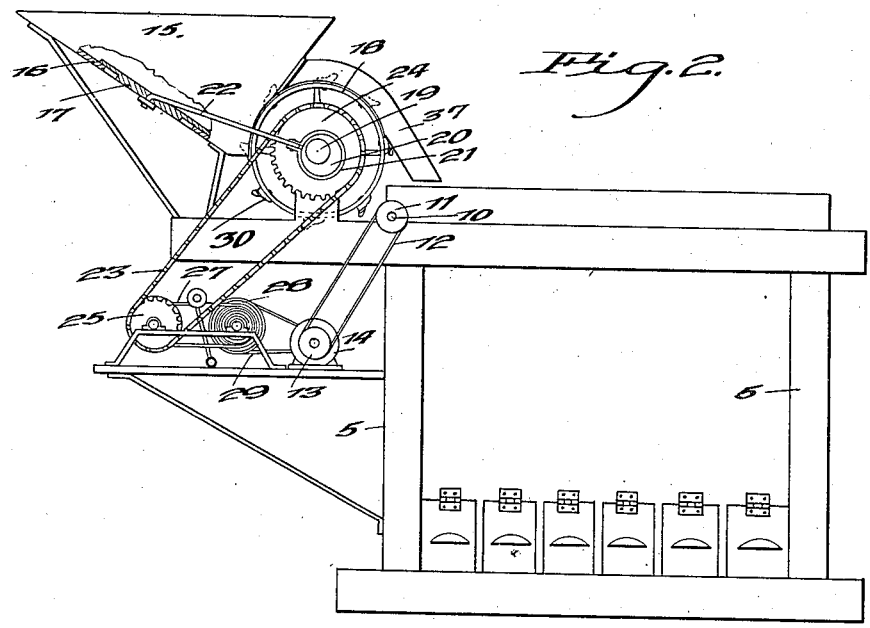
Inventor
William P. Bullard
By
Attorney Patented July 10, 1923.

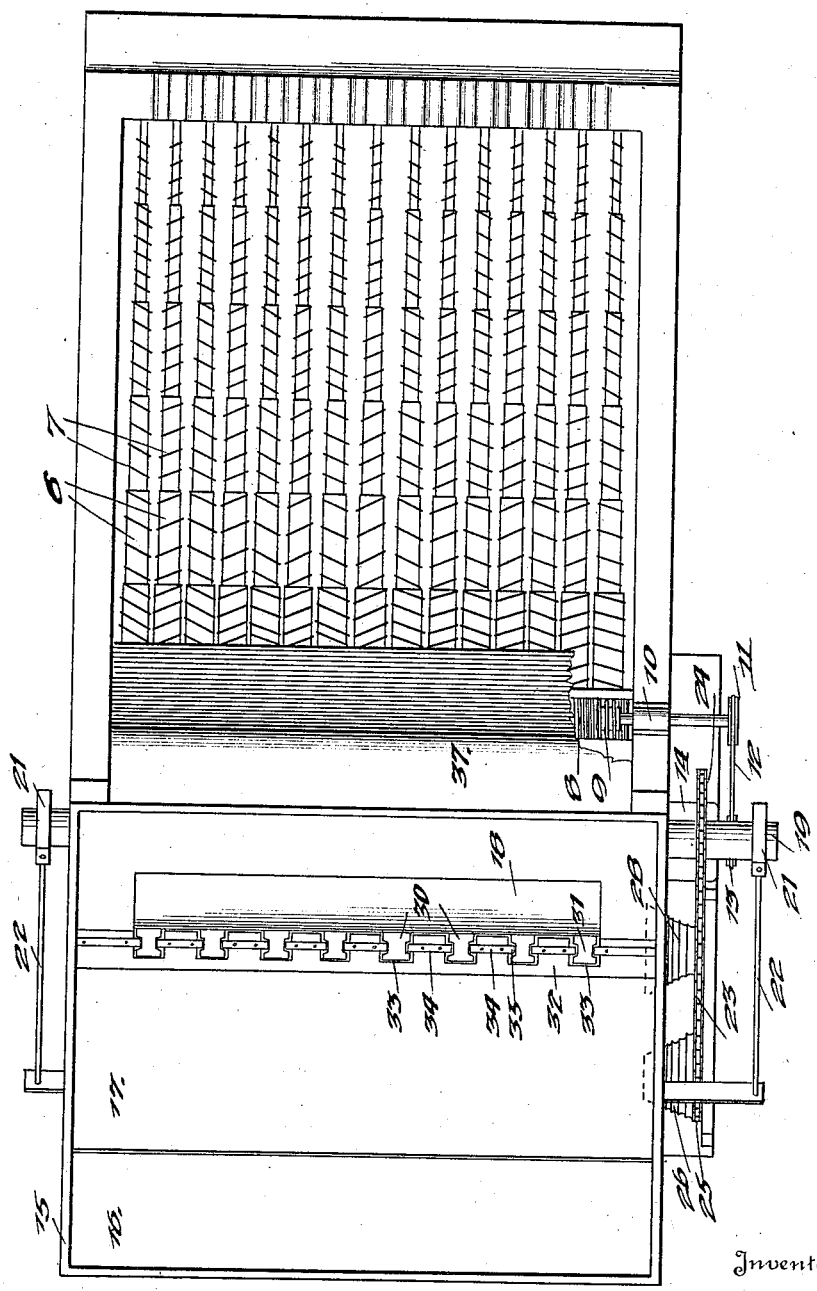

1,461,265

UNITED STATES PATENT OFFICE.

WILLIAM P. BULLARD, OF ALBANY, GEORGIA.

NUT GRADER.

Application filed May 2, 1923. Serial No. 636,225.

*To all whom it may concern:*

Be it known that I, WILLIAM P. BULLARD, a citizen of the United States, residing at Albany, in the county of Dougherty and State of Georgia, have invented certain new and useful Improvements in Nut Graders, of which the following is a specification.

The present invention relates to nut grading mechanism of the general type disclosed in my co-pending application Serial No. 539,530, filed February 27, 1922, and the object is to provide a simple and effective feeding means that will deliver nuts of various shapes and sizes, as for example, pecans, to the grading mechanism, so that they will be properly positioned on the latter.

In the accompanying drawings:—

Figure 1 is a plan view of a grading machine showing the improved grading means, Figure 2 is a side elevation of the same, Figure 3 is a detail cross sectional view through the lower portion of the hopper, Figure 4 is a sectional view on the line 4—4 of Fig. 3.

In the embodiment disclosed, a suitable frame 5 is provided, on which are journaled sets of grading rolls 6, having portions of different diameters, and provided with conveying flanges or worms 7. These grading rolls are also provided at one end with worm wheels 8 engaged by a worm 9 carried on a shaft 10. The shaft projects from one side of the frame, and is provided with a pulley 11, around which passes a driving belt 12 operated from a pulley 13 on the shaft of a suitable motor 14. It will be understood that the nuts delivered upon the sets of rolls, will be moved along said rolls by the worms 7 until they reach a space sufficiently wide for them to drop through, and as these spaces are successively wider the nuts will be graded and drop into suitable receptacles beneath.

At one end of the frame is a hopper 15 having a rear inclined wall 16 provided with an agitator plate 17. The opposite side is open, and operating across the same is the peripheral wall of a rotary drum 18 provided with a shaft 19 suitably journaled on the frame. Both ends of the shaft carry eccentrics 20 surrounded by eccentric straps 21. These straps are connected to links 22 that are in turn connected to the agitator wall 17. Consequently when the shaft 19 is rotated the agitator wall 17 is reciprocated. The shaft 19 is driven by a sprocket chain 23 operating on a sprocket wheel 24 carried by the shaft 19, and said sprocket chain also passes around a sprocket wheel 25 fixed to one end of a stepped pulley 26. A belt 27, operating around said pulley, is driven from another stepped pulley 28, suitably geared or belted to the motor 14 as shown at 29.

Referring now more particularly to Figures 1, 3 and 4, it will be noted that the peripheral wall of the drum 18 is provided with projecting lugs 30 having their upper faces concaved, as shown at 31, forming nut carrying cups. The lower wall of the hopper is in the form of a substantially horizontal plate 32, having notches 33 through which the cups pass upwardly. The plate furthermore carries a series of longitudinally disposed bars 34 seated in grooves in said plate, and having their ends 35 projecting into the opposite sides of the notches 33. The cups are provided in their sides with grooves 36 through which the projecting ends 35 of the bars 34 pass.

With this construction, it will be evident that if the nuts are placed in the hopper 15 and the apparatus is in operation, the agitator wall 17 will be reciprocated, insuring the downward movement of the nuts on to the bottom plate 32, and over the openings or notches 33. They will not drop down through said notches, however, because of the projecting ends 35 of the bars 34. When a cup passes through a notch, it will pick up the nut thereover, carrying it on over the top and delivering into a chute, as 37, which will discharge it between two coacting grade rolls and said nut will move down the rolls until it reaches a place between them that will permit its gravitation into a receiver.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In nut feeding means, a hopper having a wall member with openings therein, and a rotary member having nut-carrying projecting fingers that pass through the openings, said wall and finger members having projections and recesses through which the projections pass during the rotation of the member.

2. In nut feeding means, a hopper having a wall member with openings therein, and lateral projections extending into the openings, and a rotary member having nut-carrying fingers that pass through the openings, said fingers being provided with recesses through which the projections pass during the rotation of the member.

3. In nut feeding means, a hopper having a lower wall provided with a plurality of notches, bars secured to the wall and having their ends projecting into the notches, a drum rotatably mounted alongside the hopper and provided with peripherally projecting nut-carrying cups that move upwardly through the notches, said cups having recesses in their opposite sides that receive the projecting ends of the bars.

In testimony whereof I affix my signature in the presence of two witnesses.

WILLIAM P. BULLARD.

Witnesses:
 W. D. SUNTER,
 WM. T. LAEDWIN.